United States Patent [19]

Kilpatrick

[11] Patent Number: 5,898,402
[45] Date of Patent: Apr. 27, 1999

[54] WIDE APERATURE RADIO FREQUENCY DATA ACQUISITION SYSTEM

[75] Inventor: William Lloyd Kilpatrick, Kennesaw, Ga.

[73] Assignee: Federal Communications Commission/Compliance and Information Bureau/Equipment Development Group, Powder Springs, Ga.

[21] Appl. No.: 08/865,929

[22] Filed: May 30, 1997

[51] Int. Cl.[6] ............................................. G01S 5/02
[52] U.S. Cl. ..................... 342/417; 423/442; 423/444; 423/445
[58] Field of Search .................................. 342/417, 423, 342/424, 442, 444, 445

[56] References Cited

U.S. PATENT DOCUMENTS

| | | |
|---|---|---|
| 3,803,612 | 4/1974 | Alcock et al. . |
| 3,943,514 | 3/1976 | Afendykiw et al. . |
| 3,946,395 | 3/1976 | Kirchoff . |
| 3,971,027 | 7/1976 | Alcock et al. . |
| 3,973,262 | 8/1976 | Bohm . |
| 4,109,250 | 8/1978 | Vachenauer et al. . |
| 4,213,131 | 7/1980 | Kaiser, Jr. . |
| 4,227,196 | 10/1980 | Langeraar . |
| 4,481,519 | 11/1984 | Margerum . |
| 4,639,733 | 1/1987 | King et al. . |
| 4,734,702 | 3/1988 | Kanlan . |
| 4,809,012 | 2/1989 | Tong . |
| 4,845,502 | 7/1989 | Carr et al. . |
| 4,876,549 | 10/1989 | Masheff . |
| 4,888,593 | 12/1989 | Freidman et al. . |
| 4,975,710 | 12/1990 | Baghdady . |
| 5,075,696 | 12/1991 | Wilby et al. . |
| 5,189,429 | 2/1993 | Guard . |
| 5,255,000 | 10/1993 | Puzzo . |
| 5,327,144 | 7/1994 | Stilo et al. . |
| 5,355,141 | 10/1994 | Graham et al. . |
| 5,572,220 | 11/1996 | Cai . |
| 5,574,468 | 11/1996 | Rose . |

Primary Examiner—Thomas H. Tarcza
Assistant Examiner—Dao L. Phan
Attorney, Agent, or Firm—W. Ferrel Bentley, Jr.

[57] ABSTRACT

This invention relates to a wide aperture radio frequency data acquisition system which collects coherent samples from multiple points in a defined plane at the surface of the ground. The information collected can be processed with suitable algorithms to extract the bearing, frequency, and power spectra of the arriving radio frequency wavefront.

This system consists of an antenna system; a multi-channel receiver system incorporating mixers, filters, amplifiers, analog to digital converters, digital down converters; a digital signal processor; and a computer. The electrically short, active antennas with frequency independent response are connected to the multiple channel receiving system, one channel per antenna receiving the signal. The receiver uses two frequency conversion oscillators for coarse but accurate frequency synthesis to convert the received signal's frequency. Then, the signal is converted to a digital signal. This early conversion to a digital signal allows total intermediate frequency processing in digital mode with inherently matched filters and demodulators. The receiver is designed with low cost components to produce a very large and linear dynamic range. The digital down converter provides accurate fine tuning, bandpass filters the signal, reduces the data rate, and formats the output for extraction of amplitude and phase information from the signal.

The processing algorithm analyzes the data to determine arriving field strength, direction of arrival, elevation of arrival, frequency and power spectra of the signal. By choice of processing algorithm, the output data can be processed for either very fast information on brief signals, or thorough examination of data for fine frequency discrimination to less than one Hertz resolution.

15 Claims, 4 Drawing Sheets

WIDE APERATURE RADIO FREQUENCY DATA ACQUISITION SYSTEM

The invention described herein was made by an employee of the United States Government and may be manufactured and used by and for the Government for governmental purposes without the payment of any royalties thereon or therefor.

BACKGROUND OF THE INVENTION

1. Field of the Invention

This invention relates to finding the direction from which a radio signal was transmitted by gathering data about the signal and evaluating the signal's characteristics such as the angle of arrival azimuth/elevation, frequency, modulation, and signature wherein the receiver station is capable of determining the time of travel or bearing of the received signals with respect to the station by utilizing plural receivers as shown in claim 342/444.

2. Prior Art

The prior art shows two broad categories of systems: short base line receiving arrays where an electronic commutator samples signals sequentially or dual channel receivers which sample two antennas out of a set of antennas at a time and cross correlate to measure phase/time difference of arrival. The phase of the signals indicates the angle of arrival of the radio frequency signal.

These systems typically increase the number of successive scans to improve the accuracy of the determined bearing and are usually limited to determining azimuth and elevation angles of arrival. Other systems use directional antennas that are either manually rotated or use an electronic commutator.

SUMMARY OF THE INVENTION

This system has several advantages over existing technology. The first advantage to this system is the simultaneous monitoring of all antennas at the same time rather than sampling from one or two antennas at a time. The simultaneous monitoring of all antennas gives a more complete picture of the received signal and allows direction finding on signals of shorter time length. Second, the system is completely electronic and does not require moving parts, thereby reducing complexity of fabrication and maintenance and increasing reliability and lifetime. Third, the system does not rely on the expertise of an operator to determine a bearing because a computer calculates a bearing, thereby reducing personnel requirements and human error. Fourth, the system can be installed in very remote locations because it is capable of sending the bearing in digital format over any convenient means of transmission to a central location. Fifth, the system is faster than conventional radio direction finders because simultaneous data sets are gathered from each antenna to calculate the bearings. Sixth, the array covers a long base line to average out the anomalies normally found in propagation of radio waves such as multipath, fading, etc. Seventh, because the system can use many different algorithms for processing of the data, it is able to provide a broader functionality to the user, such as frequency determination and transmitter characterization.

This invention gathers and analyzes a received radio frequency signal to determine its characteristics including the direction of arrival. It uses widely spaced omnidirectonal amplified receiving antennas with matched frequency independent response. By including a gain stage within the antenna housing, each antenna can be active and electrically short. The antenna layout is shaped as an equilateral triangle on the surface of the ground. The antennas are placed in a series of congruent equilateral triangles having a common apex wherein the sides of each successive triangle increase threefold from the apex. The data acquisition unit consists of eleven matched channels. Each channel consists of a phase matched set of an antenna, an amplifier, a coaxial cable, and a receiver. Each receiver low pass filters the signal. It then passes the signal directly to the analog to digital convertor or optionally up mix heterodynes, helically bandpass filters the signal, and down mix heterodynes depending upon the desired frequency. Computer controlled-frequency oscillators used in the mixing process creates coarse but accurately synthesized mixing frequencies. This translated a block of signals to a lower frequency. The signal is then passed to an analog to digital converter (A/D). Since an A/D is only able to accurately convert frequencies up to the Nyquist frequency, the heterodyne process is used to bring a broader frequency range into the digital domain. This early conversion to a digital signal allows total intermediate frequency processing in the digital mode. The signal data is passed through a digital down converter to accurately tune and filter the signal, lower the data rate, and format the data. The hardware digital signal processor (DSP) then accumulates the sets of data to determine various characteristics of the signal. Depending upon the algorithm chosen, the signal can be analyzed quickly or very thoroughly for fine frequency determination. The thorough analysis of the signal yields the arriving field strength, azimuth of arrival, elevation of arrival, frequency, and power spectra. Synchronization with other systems, which can be widely spaced, is achieved by coordinating all timing with a clock based upon the global positioning satellite system (GPS). The GPS clock provides an extremely accurate time standard against which all received signal times can be compared. Thus, when this invention is used as a part of a larger system of multiple direction finders, it is possible for real time processing of the same signal, received at the same time, at stations widely dispersed geographically.

DESCRIPTION OF THE PREFERRED EMBODIMENT

Figure 1:
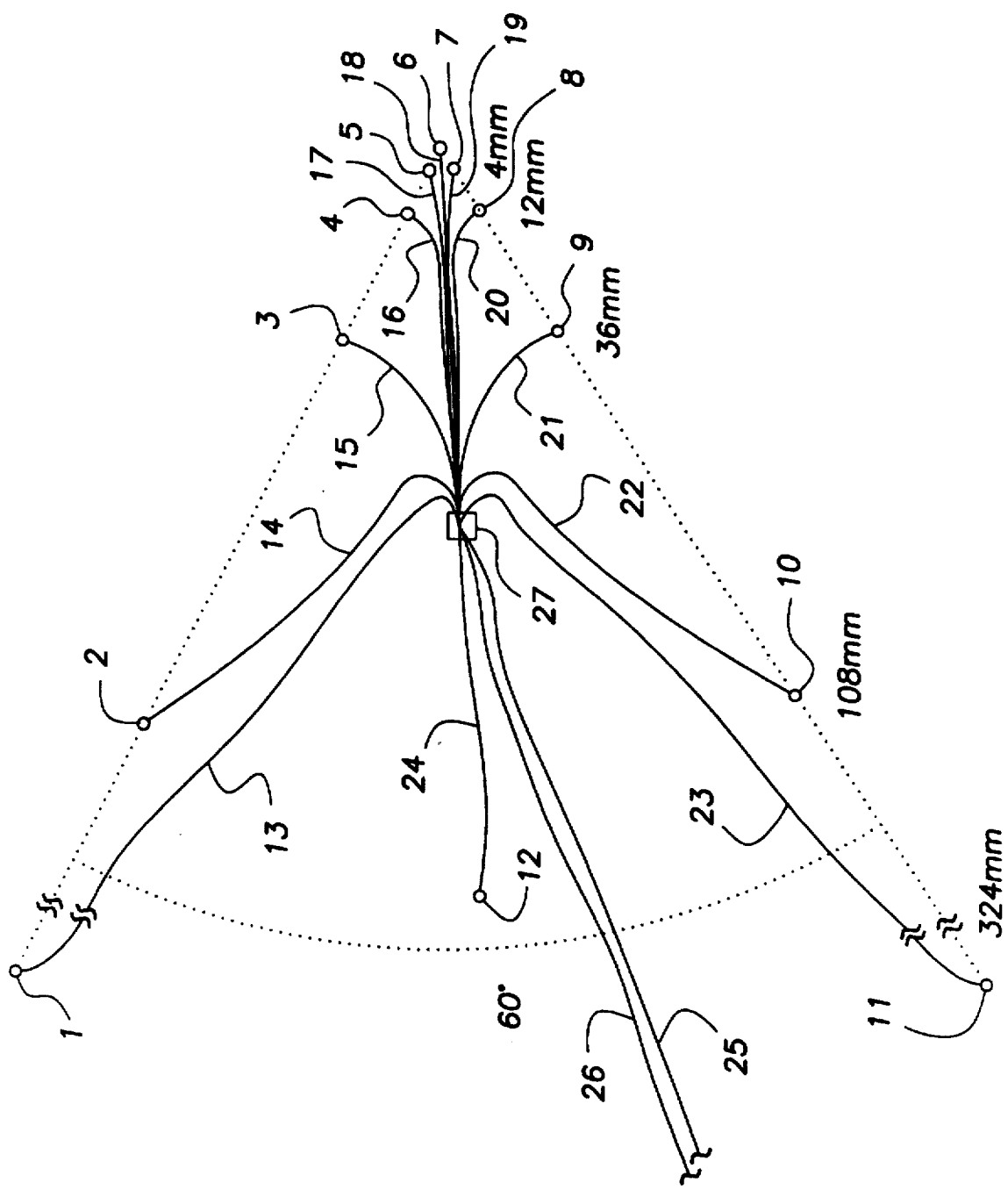
FIG. 1: Antenna layout and interconnection on the ground surface

FIG. 1 shows the on-site physical layout of the antennas and interconnections on the ground surface (45). The data gathering antennas (1–11) are connected via underground cables (13–23) respectively to the receiver system in the receiver house (27). In addition, the monitoring antenna (12) is connected via underground cable (24) to a separate audio receiver in the receiver house (27). The telecommunications cabling (25) and electrical power cabling (26) come from off-site and lead into the receiver house (27).

Antennas (1–11) are oriented in a v-shape so that antennas 1 and 11 are endpoints of two equal-length opposite legs interjoining at a 60 degree angle with antenna 6 at the center apex. The separation distance between each antenna and the apex is three times the distance of separation from the apex to the previous antenna. The distance separating antennas 2 and 6, antennas 6 and 10, and antennas 10 and 2 are equal and thus antennas 2, 6, and 10 together define the three vertices of a equilateral triangle. This is typical for each set of the five antenna groups. Antenna 12, the monitoring antenna, is centered between the two legs of the antenna array.

The electrical lengths of underground cables 14–22 are matched in order to minimize phase difference between the respective channels. The electrical lengths of underground cables 13 and 23 are equal to each other. The difference between the shorter cable set (14–22) and longer cable set (13, 23) is adjusted in the mathematical calculation of the software.

Figure 2:
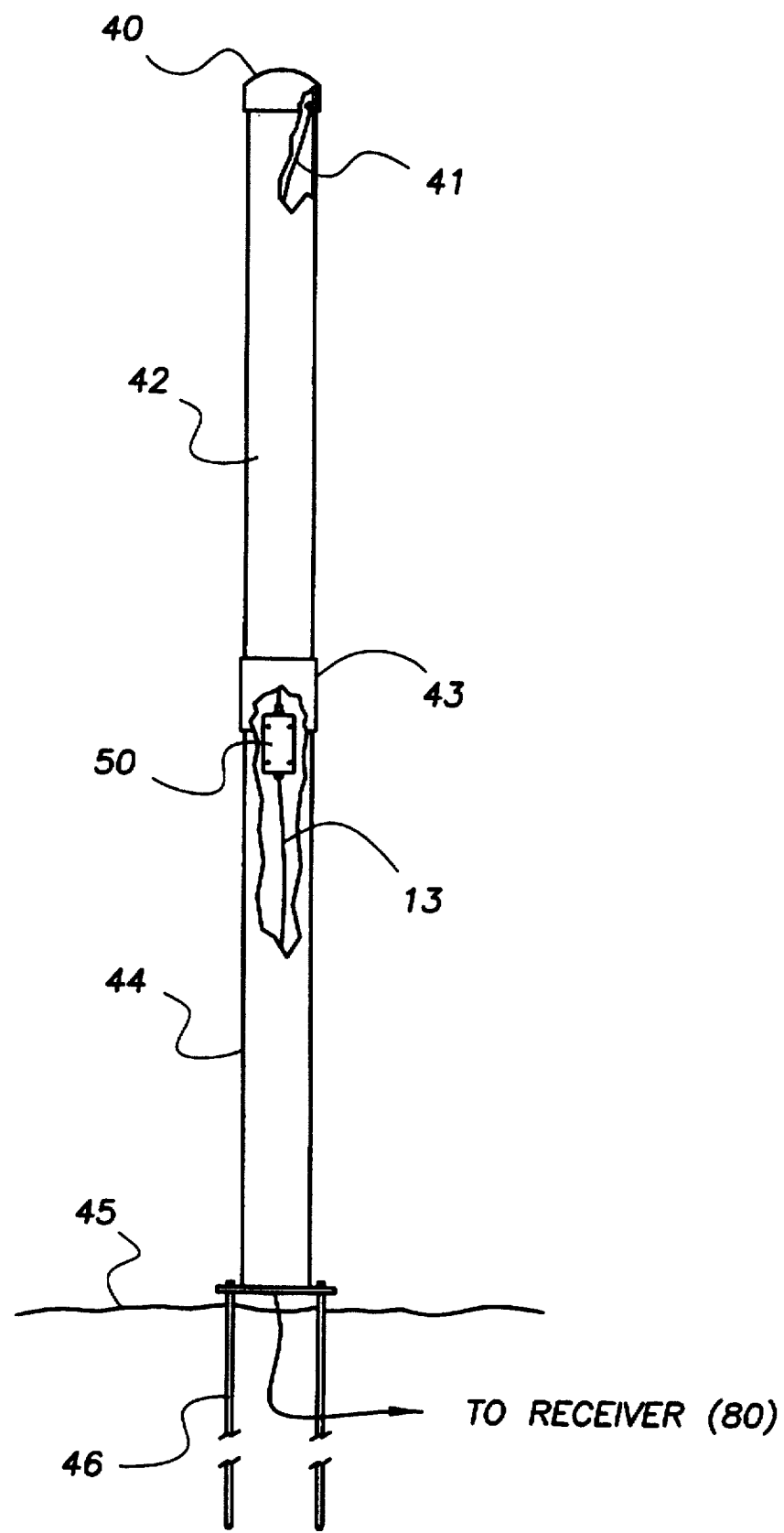
FIG. 2: Detailed diagram of the receiving antenna

FIG. 2 shows the details of the antenna. The active element (42) is a cylindrical tubemade of conductive material, one meter in length and eleven centimeter in diameter with a weather proof cap (40). This element is held in place by an insulating coupling (43) and mounted on the metal base (44) of the same shape, length and diameter. This base is mounted on multiple ground rods (46) driven into the ground surface (45). The feed wire (41) connects the active element to the impedance matching amplifier (50). Further, the feed wire is connected to the top of the active element (42) to reduce the effects of lightning damage. The amplifier (50) incorporates a FET to provide impedance matching, and uses a capacitive signal splitter to couple the capacitance of the antenna in free space to the capacitance of the high impedance FET and achieve a frequency independent response. The amplifier (50) receives power via the coaxial cable (13) and sends the received signal to the receiver (80) via the same coaxial cable (13).

Figure 3:
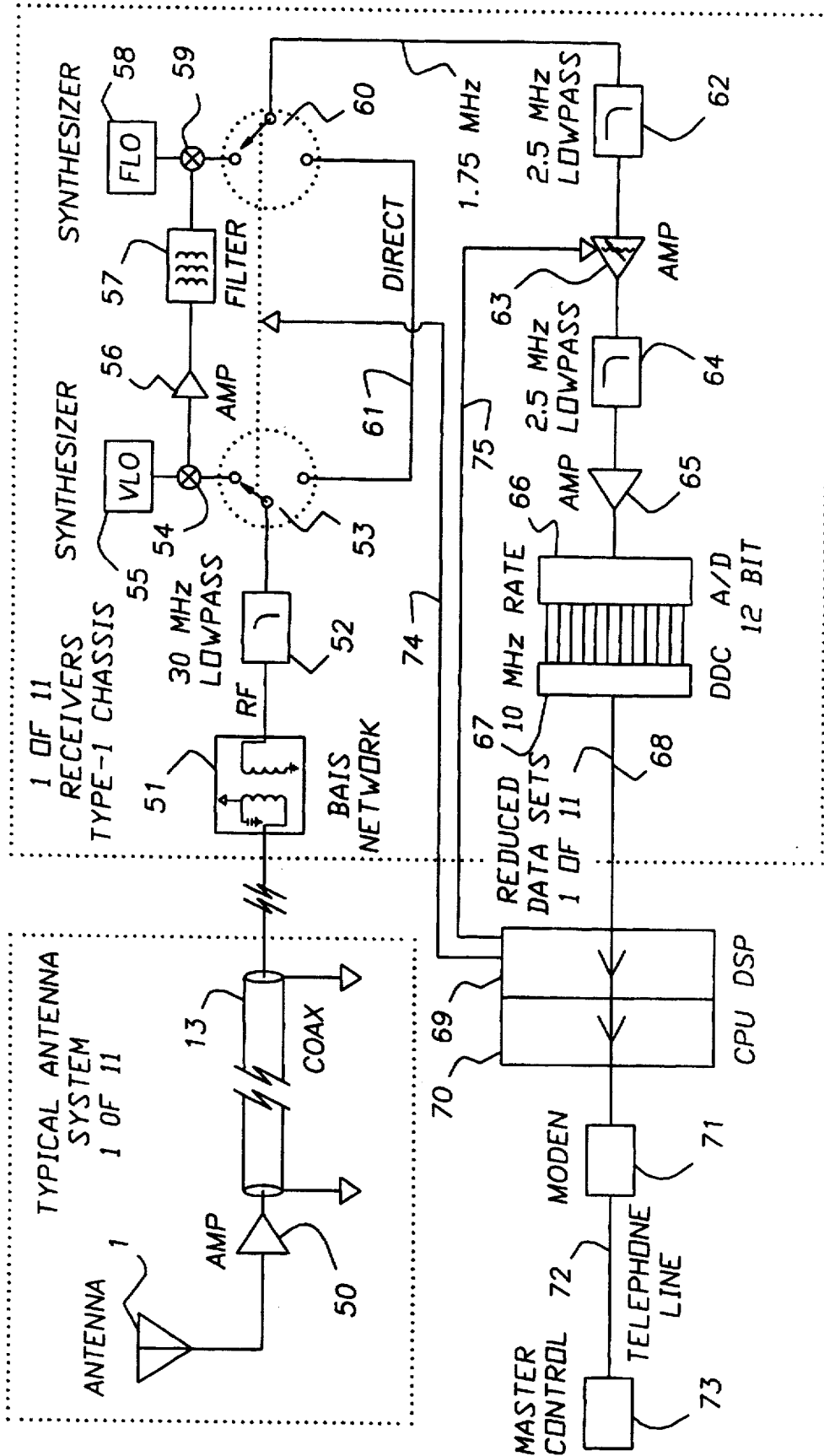
FIG. 3: The block diagram of a typical receiver channel

FIG. 3 shows the block diagram of the specific components used and the interconnection of the antennas and receiver system. Each antenna receives the incoming wavefront; the individual characteristics of these received signals are based upon the antenna's specific location in the antenna array. The received signals pass through each antenna's amplifier (50) for impedance matching purposes and travel through the phase matched coaxial cable (13) to the input of each corresponding receiver (80–90). Bias network (51) provides power to the amplifiers (50) via coaxial cable (13). The signal is then filtered through a 30 MHz lowpass filter (52) which removes any unwanted higher frequency components.

Depending upon whether the received radio frequency signal must be translated or directly converted from analog to digital, the filter output is passed either to the first mixer (54) or the direct connection (61) to the A/D (66) respectively as determined by the position of the relays (53, 60). The relays are switched via a control line (74) from the DSP (69). For frequencies not within the range of the A/D (66), signals are passed to the first mixer (54) and mixed with the output of the variable local oscillator synthesizer (VLO) (55) to produce a signal in the VHF frequency range. That signal is then amplified by amplifier (56) and passed to the helical bandpass filter (57). The filter (57) is tuned and has a broadband uniform phase response. The filter (57) is tuned to compensate for relative phase differences between the channels. The output of the filter (57) is then heterodyned back to low frequencies using second mixer (59) and fixed local oscillator synthesizer (FLO) (58). Signals from the output of relay (60) are passed through lowpass filter (40) to remove any frequency components above the desired conversion range of the A/D (66) and then amplified by a variable gain amplifier (63) controlled by the DSP(69). The output is then passed through another lowpass filter (64) and buffered by amplifier (65) before being introduced to the input of the A/D (66) which converts the input signal at a 10 MHz sample rate.

The A/D (66) produces extremely large quantities of data. To reduce the data quantity to a level manageable by the computer, the A/D output is passed to a programmable digital down converter (DDC) (67). The DDC (67) is programmed to select the desired frequency segment from the translated block of frequencies from the heterodyne process. The reduced data set from each channel is placed onto a bus which is time shared among the eleven receiver channels. The eleven sets of data are fed into the DSP (69) which is installed on a card plugged into a computer (70). The computer (70) accepts the data from the DSP (69), processes it for the desired information and saves the data set for possible further analysis. The processing may be performed in the DSP (69) or the computer (70). For more information on the processing method, attention is directed to the section labeled Mode of Operation.

The derived data is written by the computer (70) to the modem (71) which is connected to telephone line (72). Master control computer (73) collects data from multiple remote sites via dedicated telephone lines at a central point and plots the respective bearings on a world map to determine the location of the signal source.

Figure 4:
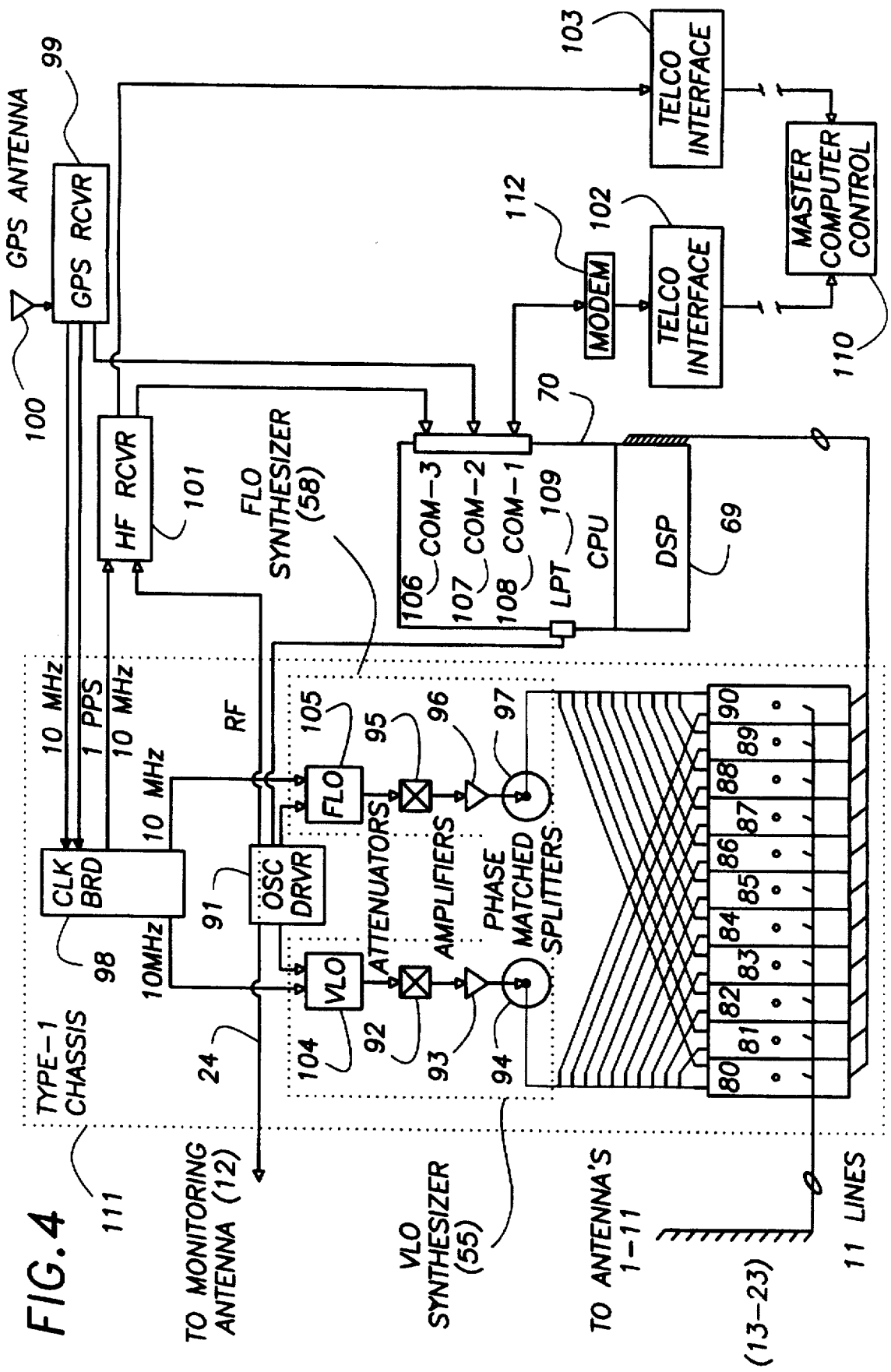
FIG. 4: The overview of the hardware for one complete remote system

FIG. 4 is an overview of the hardware for one complete remote system. The coaxial cables (13–23) connect antennas (1–11) to the matched set of receivers (80–90). The receivers (80–90) receive their VLO signal through the phase matched output of splitter (94). This signal originates in VLO (104), and the level is set via attenuator (92) and amplifier (93). The VLO (104) is used to select the frequency to be mixed up to the center frequency of the filter. The oscillator driver (91) routes the digital words that select the desired frequencies to the VLO (104) and FLO (105). In this particular case, the actual FLO (105) used is a variable local oscillator which is locked to a particular frequency. The clock board (98) distributes the 10 MHz standard to the high frequency receiver (HFR) (101), VLO (103), and FLO (105). The FLO output level is set by the attenuator (95) and amplifier (96). The output is then routed to each receiver by splitter (97) and fed to the mixer in each of the receivers (80–90).

The oscillator driver (91) also provides power to the monitoring antenna (12) via the coaxial cable (24). The radio frequency signal from the monitoring antenna (12) is passed to the HFR (101) via the coaxial cable (24). The oscillator driver (91) is connected to the computer LPT port (109). The clock board (98) receives the 10 MHz standard and 1 pulse per second (PPS) signals from the GPS receiver (99). The GPS receiver (99) is connected to external GPS antenna (100) to receive signals from the satellites and is controlled by the computer (70) via the COM-2 port (107). The HFR (101) provides audio output to the Telco interface (103) and is controlled computer COM-3 port (106). The computer COM-1 port (108) is connected to the modem (112) then to the Telco interface (102) which is the data link back to the master control computer (110).

This particular embodiment shows the use of a data acquisition system having eleven channels. While it is theoretically possible to have many cost limitations to be considered are physical and cost limitations to be considered. Based upon specific application parameters, eleven channels were deemed to be the appropriate balance of accuracy and practical considerations. Nine channels would have given similar information but would not have given the degree of accuracy of eleven channels due to less phase information. Thirteen channels is also within the scope of this invention, but would push the limits of practicality without a comparable increase in the phase information available for the typical commercial signals of interest. The additional channels would improve the phase information only at the lowest frequencies which are less important in this application.

Mode of Operation

Once the data is collected and placed in the proper format, the computer follows certain processes to determine the bearing of the incoming radio frequency signal. Bearing derivation operates under two basic assumptions: 1. the arriving wavefront is due to a single ray and takes the form of a planar surface of constant phase, and 2. the location of the sampling antennas is precisely known and the measurements are accurate.

The first, although not absolutely true, is a generally accepted premise in the design of direction finding systems. Engineering practice has proven that variances in the wavefront are relatively small and can usually be overcome by using averaging and discrimination techniques. The second can be assured by site location and careful attention to construction and installation details.

The theoretical basis is as follows. According to the principles of analytic geometry in three dimensions, an arbitrary plane can be described completely by an equation of the form:

$$Ax+By+Cz+D=0$$

Any orientation of this plane relative to a reference coordinate system can be described by finding the coefficients A, B C, and D which fully describe the locus of all points on that plane. Such plane may also be completely specified by locating a single point within the plane $(x_1, y_1, z_i)$ and defining a vector normal to that plane and passing through that point. The point may be evaluated according to the following equation:

$$A(x-x_1)+B(y-y_1)+C(z-z_i)+D=0$$

An incoming signal wavefront can now be visualized as lying within this plane. The normal vector has the directional components A, B, C in the directions of x, y, and z axes respectively. If the wavefront plane is moved along the normal vector such that the plane intersects the reference axes, then the three values of the reference point are all zero, and the constant D is also zero. Then, the equation for the wavefront plane becomes:

$$Ax+By+Cz=0$$

Any point on this wavefront plane has radio frequency phase value of 0 radians. If we locate the apex antenna of our array at the zero axis point, then the direction of the normal vector to the plane is defined by the unit vectors along the Cartesian coordinates of $$Ax:By:Cz$$

If the units of the Cartesian coordinate system are selected to represent the wavelength at the chosen frequency, then the magnitude of the propagation vector will represent the unity wavelength of the received radio frequency signal, and the overall direction will be the inverse of the bearing in both azimuth and elevation planes of the signal being received. The magnitude is found by applying the Pythagorean theorem to the three components of the vector $$|P|=sqrt(A^2+B^2+C^2)$$

Having located the apex of the array at the origin of the coordinate system through which the wavefront plane passes, and scaling the locations of the remaining antennas to the wavelength of the frequency of interest, it only remains to measure the value of the phase difference between the apex and the various other antennas and solve the equations for the unit vectors along the three axes. The value of the radio frequency phase difference is the distance between the locations of the individual antennas and the wavefront plane. This difference equates to the distance in wavelengths along the vector of propagation on a line passing through the probe normal to the wavefront plane. The formula for this distance is $$d_i=|Ax_i+By_i+Cz_i+D|/|P|$$

This is the characteristic equation of the wavefront plane with the offset, D, included and normalized by the magnitude of the normal vector of propagation. If the location of the antenna probe is known in three dimensions, then the phase offset can be calculated to the wavefront plane. Conversely, if the measured phases from at least two antennas with respect to the apex are known, then the equations for the theoretical phase offset can be solved simultaneously to determine the coefficients for orientation of the wavefront plane. In the practical implementation, the problem is simplified considerably by making the elevations of all antennas equal and locating them entirely within the reference $z=0$ plane. Solving for the wavefront planes will then yield the bearing from which the signal was transmitted.

To increase the accuracy, the system can use the measured phases in groups of equal spacing and solve for the wavefront planes for each spacing interval. The agreement of these various sets of measurements are then compared to determine if the assumption of uniform distribution of a single arriving ray of radio frequency energy was valid.

In this implementation of a direction finder, each antenna receives the incoming signal with a frequency independent antenna probe. The signal is passed to the receiver where it is low pass filtered, optionally heterodyned up, bandpassed, and heterodyned back down, then amplified to a level suitable for the A/D. The desired signal may be chosen from many different signals within a bandwidth. The A/D's of each channel are phase locked to each other (and frequency locked to the other systems across the country) through the use of a GPS frequency standard. Each A/D conversion is separated by very precise time intervals so that all data points are taken at periodic precise points in time. The output of each A/D is fed to a DDC which decimates the signal data and provides quadrature vector samples from which phase/magnitude information may be derived. The DDC can be programmed for various decimation rates to provide more detail over longer periods of time, for one selected signal within the bandwidth.

The DSP receives the data from the DDC of all channels at a very high rate over a time shared data bus. The DSP converts that data into a format that can be passed to the computer for processing. Data is taken in groups of 1024 points—a compromise between speed of acquisition, size of data files, and resolution of signal spectral components available. The computer accepts the data for each of the eleven channels and performs analysis using either of two methods.

The first method makes an assumption that the entire bandwidth selected by the DDC contains a single signal at each specific point in time. Each data point from the DDC contains the quadrature I and Q values of the incoming phase vector at that point in time. After converting the I and Q to a phase and magnitude, using the vector math previously described, the orientation of the incoming wavefront is calculated sample by sample. Azimuth and elevation information for each sample is calculated and a histogram is created for the group. The histogram is subsequently examined for bearing groupings and ordered by frequency of occurrence. These groupings are then analyzed and the mean and standard deviations are reported to the master control computer.

The second method utilizes fast Fourier transforms (FFT). The computer accepts each of eleven groups of 1024 samples and performs a FFT analysis to convert the data into the frequency domain. After conversion, a specific spectral component can be selected from the frequency domain and is used to derive the phase and magnitude for that component only. The phases of the specific component from each channel are then combined as before to calculate the bearing. The FFT data can also be used to determine the precise frequency of any spectral component or to determine modulation products of a signal.

The invention as claimed is:

1. A data acquisition unit for gathering data about a transmitted analog radio frequency signal having a bearing from an unknown location, comprising:

antenna array means for receiving the transmitted radio frequency signal,
  said signal having a bearing, modulation, and frequency,
  said array means shaped in a 60 degree triangle on a substantially flat surface with one antenna being located at the apex of the triangle, said array means having n number of antennas, wherein n=9, 11, or 13, spaced along two legs of the triangle,
  said triangle having a defined apex common to both legs wherein the space between the antennas increase in a ratio of 3 to 1 from the apex on each of the two legs of the triangles,
  each antenna outputting a received analog radio frequency signal having a bandwidth, frequency, and phase, matched set of n receiver channel means for receiving said received analog radio frequency signals from each antenna of the array means and converting said received analog radio frequency signals for further processing, said receiver channel means comprising:
  clock means for keeping all receiver channel means synchronized,
  n sets of mixer means for translating said received analog radio frequency signals to a lower frequency, producing translated radio frequency signals,
  n sets of analog to digital converter (A/D) means for converting said translated analog radio frequency signals to digital signals containing data representing said analog received radio frequency signals, and
  n sets of digital down converter means for reducing the digital signals to represent a specific narrow bandwidth signals, processor means for collecting the narrow bandwidth signals from the n sets of digital down converter means, for recording the narrow bandwidth signal, and for determining the bearing, modulation, and frequency of the radio frequency signal, and modem means for sending the bearing, modulation, and frequency to a master control point.

2. The data acquisition unit of claim 1, further comprising:
said mixer means further comprising an up converter, a bandpass filter, and a down converter, all for removing unwanted signals from the received analog radio frequency signals,
said A/D means having a basic dynamic range, the A/D means further comprises a variable gain amplifier means for extending the dynamic range of the A/D means, and
wherein said processor means comprises means for determining the phase of said received analog radio frequency signals to calculate the bearing of the transmitted analog radio frequency signal.

3. A process of data gathering to determine desired characteristics of a transmitted analog radio frequency signal from an unknown location:
detecting the transmitted analog radio frequency signal at a specific time via a linearly dispersed antenna array and outputting n analog radio frequency signals,
  wherein the transmitted analog radio frequency signal has a bearing, and the n analog radio frequency signals have a phase,
  wherein the antenna array is shaped in a 60 degree triangle on a substantially flat surface,
  said array having n number of antennas, wherein n=9, 11, or 13, spaced along two legs of the triangle, and
  said triangle having a defined apex between two legs wherein the space between the antennas increase in a ratio of 3 to 1 from the apex on each of the two legs,
receiving said n analog radio frequency signals with a multi-channel receiver using a clock to synchronize the channels and outputting n converted radio frequency signals,
converting the n converted radio frequency signals to n digital signals, said n digital signals containing data representing the n analog radio frequency signals, via an analog to digital converter (A/D),
reducing the n digital signals to a corresponding narrow bandwidth signal by digital down conversion,
determining the phase of the n analog radio frequency signals, and
calculating the bearing of the transmitted analog radio frequency signal.

4. A process of data gathering according to claim 3 further comprising:
wherein said determining the phase comprises:
  defining multiple points in time beginning at a specified time and extending over a specified time span, and
  at each point in time, determining the average phase over a specified bandwidth utilizing a sample by sample method, wherein the sample by sample method comprises:
    gathering the real and imaginary components of the signal at each antenna at each instant in time, and
    calculating the magnitude and phase of the composite received radio frequency signal at each antenna at each instant in time, and
wherein calculating the bearing comprises:
  solving for a reference wavefront plane consistent with the n multiple points.

5. A process of data gathering according to claim 4 further comprising:
using a linear regression technique to derive a best straight line phase fit along each leg according to the wavelength of the radio frequency signal and the antenna spacing, and
calculating the final bearing utilizing values determined by the best straight line fit for both legs of the antenna array.

6. A process of data gathering according to claim 3 further comprising:
wherein said determining the phase comprises:
defining multiple points equally spaced in time beginning at a specified time and extending over a specified time span,
isolating the spectral components of the radio frequency signal using fast Fourier transform techniques to reduce the interfering components from undesired signals,
calculating the phase of the selected spectral components of interest, and
wherein calculating the bearing comprises:
solving for a reference plane consisting of n multiple points.

7. A process of data gathering according to claim 4 further comprising:
wherein said calculating the bearing further comprises averaging similar bearing calculations to yield one or more time averaged bearings over a time span.

8. A process of data gathering according to claim 6 further comprises:
wherein said calculating the bearing further comprises:
averaging similar bearing calculations to yield one or more time averaged bearings over a time span.

9. A data acquisition unit for gathering data about a transmitted analog radio frequency signal having a bearing from an unknown location, comprising:
an antenna array means for receiving the transmitted radio frequency signal,
said signal having a bearing, modulation, and frequency,
said array means comprising multiple antennas, and
each antenna outputting a received analog radio frequency signal having a phase
matched set of n receiver channel means for receiving said received analog radio frequency signals from each antenna of the array means and converting said received analog radio frequency signals for further processing, said receiver channel means comprising:
clock means for keeping all receiver channel means synchronized,
n sets of mixer means for translating said received analog radio frequency signals to a lower frequency, producing a translated radio frequency signals,
n sets of analog to digital converter (A/D) means for converting said translated radio frequency signals to digital signals containing data representing said analog received radio frequency signals, and
n sets of digital down converter means for reducing the digital signals to narrow band width signals,
processor means for collecting the narrow bandwidth signals from the n sets of digital down converter means, for recording the narrow bandwidth signal, and for determining the bearing, modulation, and frequency of the radio frequency signal, and
modem means for sending the bearing, modulation, and frequency to a master control point.

10. The data acquisition unit of claim 9, further comprising:
said mixer means further comprising an up converter, a bandpass filter, and a down converter, all for removing unwanted signals from the received analog radio frequency signals,
said A/D means having a basic dynamic range, the A/D means further comprises a variable gain amplifier means for extending the dynamic range of the A/D means, and
wherein said processor means comprises means for determining the phase of said received analog radio frequency signals to calculate the bearing of the transmitted analog radio frequency signal.

11. A data acquisition unit as set forth in claim 1 further comprising:
said antenna comprising:
an active element comprising a hollow cylinder 1 meter long, having a top end, a bottom end, and a diameter of 11 cm,
a weather proof cap covering the top end of the active element,
a base comprising a hollow cylinder having a top end, a bottom end, and the diameter, said top end of the base connected to the bottom end of the active element, the bottom end of the base connected to the flat plate in a perpendicular relationship, said flat plate having multiple holes,
multiple ground rods placed through the multiple holes,
a feed wire connected to the active element, said feed wire connected to the top end of the active element,
an impedance matching amplifier connected to the feed wire, said amplifier comprising a capacitive signal splitter network to produce frequency independent response, and
coaxial cable connected to the amplifier for receiving power and carrying the signal to the receiver means.

12. A data acquisition unit as set forth in claim 2 further comprising:
said antenna comprising:
an active element comprising a hollow cylinder 1 meter long, having a top end, a bottom end, and a diameter of 11 cm,
a weather proof cap covering the top end of the active element,
a base comprising a hollow cylinder having a top end, a bottom end, and the diameter, said top end of the base connected to the bottom end of the active element, the bottom end of the base connected to the flat plate in a perpendicular relationship, said flat plate having multiple holes,
multiple ground rods placed through the multiple holes,
a feed wire connected to the active element, said feed wire connected to the top end of the active element,
an impedance matching amplifier connected to the feed wire, said amplifier comprising a capacitive signal splitter network to produce frequency independent response, and
coaxial cable connected to the amplifier for receiving power and carrying the signal to the receiver means.

13. A data acquisition unit as set forth in claim 9 further comprising:
said antenna comprising:
an active element comprising a hollow cylinder 1 meter long, having a top end, a bottom end, and a diameter of 11 cm,
a weather proof cap covering the top end of the active element,
a base comprising a hollow cylinder having a top end, a bottom end, and the diameter, said top end of the base connected to the bottom end of the active element, the bottom end of the base connected to the flat plate in a perpendicular relationship, said flat plate having multiple holes,
multiple ground rods placed through the multiple holes,
a feed wire connected to the active element, said feed wire connected to the top end of the active element, an impedance matching amplifier connected to the feed wire, said amplifier comprising a capacitive signal splitter network to produce frequency independent response, and coaxial cable connected to the amplifier for receiving power and carrying the signal to the receiver means.

14. A data acquisition unit as set forth in claim 9 further comprising:

said antenna comprising:

an active element comprising a hollow cylinder 1 meter long, having a top end, a bottom end, and a diameter of 11 cm, a weather proof cap covering the top end of the active element, a base comprising a hollow cylinder having a top end, a bottom end, and the diameter, said top end of the base connected to the bottom end of the active element, the bottom end of the base connected to the flat plate in a perpendicular relationship, said flat plate having multiple holes, multiple ground rods placed through the multiple holes, a feed wire connected to the active element, said feed wire connected to the top end of the active element, an impedance matching amplifier connected to the feed wire, said amplifier comprising a capacitive signal splatter network to produce frequency independent response, and coaxial cable connected to the amplifier for receiving power and carrying the signal to the receiver means.

15. A data acquisition unit as set forth in claim 10 further comprising:

said antenna comprising:

an active element comprising a hollow cylinder 1 meter long, having a top end, a bottom end, and a diameter of 11 cm, a weather proof cap covering the top end of the active element, a base comprising a hollow cylinder having a top end, a bottom end, and the diameter, said top end of the base connected to the bottom end of the active element, the bottom end of the base connected to the flat plate in a perpendicular relationship, said flat plate having multiple holes, multiple ground rods placed through the multiple holes, a feed wire connected to the active element, said feed wire connected to the top end of the active element, an impedance matching amplifier connected to the feed wire, said amplifier comprising a capacitive signal splitter network to produce frequency independent response, and coaxial cable connected to the amplifier for receiving power and carrying the signal to the receiver means.

* * * * *